(12) United States Patent
Kishimoto et al.

(10) Patent No.: US 10,000,270 B2
(45) Date of Patent: Jun. 19, 2018

(54) MOVING BODY CONTROL DEVICE, MOVING BODY CONTROL METHOD, AND MOVING BODY CONTROL PROGRAM

(71) Applicant: FURUNO ELECTRIC CO., LTD., Nishinomiya, Hyogo (JP)

(72) Inventors: Kazuya Kishimoto, Nishinomiya (JP); Hitoshi Maeno, Nishinomiya (JP); Masashi Imasaka, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 0 days. days.

(21) Appl. No.: 15/538,317

(22) PCT Filed: Nov. 26, 2015

(86) PCT No.: PCT/JP2015/083152
§ 371 (c)(1),
(2) Date: Jun. 21, 2017

(87) PCT Pub. No.: WO2016/104031
PCT Pub. Date: Jun. 30, 2016

(65) Prior Publication Data
US 2017/0349258 A1    Dec. 7, 2017

(30) Foreign Application Priority Data

Dec. 22, 2014   (JP) .................................. 2014-258202

(51) Int. Cl.
*B63H 25/42* (2006.01)

(52) U.S. Cl.
CPC ....... *B63H 25/42* (2013.01); *B63H 2025/425* (2013.01)

(58) Field of Classification Search
CPC .. B63H 25/42; B63H 2025/425; B63H 21/22; B63H 20/10; B63H 20/12; F02B 61/045
(Continued)

(56) References Cited

U.S. PATENT DOCUMENTS 3,500,025 A * 3/1970 Moulin ................ G05D 1/0208
                                                        701/116
4,513,378 A * 4/1985 Antkowiak ............ G01C 21/12
                                                        342/389
(Continued)

FOREIGN PATENT DOCUMENTS

JP   2002-178990 A    6/2002
JP   2011-218959 A    11/2011
(Continued)

OTHER PUBLICATIONS

International Search Report of the corresponding International Patent Application No. PCT/JP2015/83152, dated Feb. 23, 2016.

*Primary Examiner* — S. Joseph Morano
*Assistant Examiner* — Jovon Hayes
(74) *Attorney, Agent, or Firm* — Studebaker & Brackett PC

(57) ABSTRACT

A moving body control device includes a moving body direction sensor, a position sensor, and processing circuitry. The processing circuitry estimates a direction of disturbance. The processing circuitry sets a target position and a starting position. The processing circuitry controls a propulsion generator and a movement direction adjuster such that a heading direction sensed by the moving body direction sensor is opposite to the direction of the disturbance estimated by the processing circuitry, and when the moving body has been drifted at least a specific distance from the target position, the moving body returns to the starting position, and the heading direction at the starting position is opposite to the direction of the disturbance. The processing circuitry changes the starting position based on a distance between the target position and a position of the moving body sensed by the position sensor.

14 Claims, 6 Drawing Sheets

(58) Field of Classification Search
USPC .......................................................... 440/53
See application file for complete search history.

(56) References Cited

U.S. PATENT DOCUMENTS

| | | | | |
|---|---|---|---|---|
| 4,519,335 A * | 5/1985 | Krautkremer | ........ | B63H 21/213 114/144 E |
| 4,542,464 A * | 9/1985 | Kramer | ................ | G05D 1/0206 114/144 RE |
| 4,564,909 A * | 1/1986 | Kramer | ................ | G05D 1/0206 114/144 RE |
| 4,881,080 A * | 11/1989 | Jablonski | ................ | G01C 17/38 342/357.36 |
| 5,386,368 A * | 1/1995 | Knight | .................... | B63H 25/42 114/144 A |
| 5,947,051 A * | 9/1999 | Geiger | .................. | B62D 57/00 114/222 |
| 6,144,918 A * | 11/2000 | Meng | ....................... | G01S 19/39 342/357.31 |
| 8,082,100 B2 * | 12/2011 | Grace | .................. | G05D 1/0206 701/300 |
| 8,463,458 B2 * | 6/2013 | Wood | ..................... | G01C 21/00 701/2 |
| 8,478,464 B2 * | 7/2013 | Arbuckle | ............... | B63H 21/22 114/144 B |
| 8,581,688 B2 * | 11/2013 | Breed | ..................... | B60C 11/24 340/3.1 |
| 8,645,012 B2 * | 2/2014 | Salmon | ................ | G05D 1/0206 701/21 |
| 8,761,976 B2 * | 6/2014 | Salmon | .................. | B63H 21/21 440/6 |
| 9,377,780 B1 * | 6/2016 | Arbuckle | ................. | G05D 1/00 |
| 9,487,277 B2 * | 11/2016 | van der Tempel | ...... | B63B 17/00 |
| 9,857,794 B1 * | 1/2018 | Jarrell | ................. | G05D 1/0206 |
| 2017/0349258 A1 * | 12/2017 | Kishimoto | ............. | B63H 25/42 |

FOREIGN PATENT DOCUMENTS

| | | |
|---|---|---|
| JP | 2012-017057 A | 1/2012 |
| JP | 2013-151241 A | 8/2013 |
| JP | 2014-024421 A | 2/2014 |
| WO | 2014-065147 A1 | 5/2014 |

* cited by examiner

MOVING BODY CONTROL DEVICE, MOVING BODY CONTROL METHOD, AND MOVING BODY CONTROL PROGRAM

CROSS REFERENCE TO RELATED APPLICATIONS

This application is a U.S. National stage of International Application No. PCT/JP2015/083152 filed on Nov. 26, 2015. This application claims priority to Japanese Patent Application No. 2014-258202 filed on Dec. 22, 2014. The entire disclosure of Japanese Patent Application No. 2014-258202 is hereby incorporated herein by reference.

BACKGROUND

Field of the Invention

The present invention relates to a moving body control device, a moving body control method, and a moving body control program for moving a moving body.

Background Information

In order to improve the efficiency of fishing, the fishing is performed at a location where many of the targeted fish are believed to live (such as at a fish reef or a shoal). The fisherman maneuvers his vessel so as to repeatedly pass this location in order to confirm whether or not the targeted fish are at that location (this is known as trolling).

At sea, the vessel is drifted along by disturbances such as the wind or tides. As shown in FIG. 7A, the direction of the bow of the vessel changes to be perpendicular to the direction of the disturbance (and particularly the wind direction) when the vessel is drifted in the direction of the disturbance so as to pass the target position.

Then, the direction of the target position becomes a direction that is perpendicular to the direction of the bow (the direction of the disturbance). As a result, as shown in FIG. 7B, the vessel sometimes may not pass the target position even if the rudder is turned as far as it will go.

Also, as shown in FIG. 7B, the vessel cannot head in the direction of the disturbance because the heading is inclined with respect to the disturbance direction.

Therefore, the vessel will have a spanker to reduce the effect of the wind (see Japanese Laid-Open Patent Application Publication No. 2012-017057), or will have bow thrusters for moving in the desired direction (such as in the starboard or port directions of the hull) (see Japanese Laid-Open Patent Application Publication No. 2011-218959).

SUMMARY

However, with a single-propeller, single-rudder vessel (in which there is one rudder and one propulsion shaft), it is impossible to move in a direction that is perpendicular to the fore and aft direction.

The above-mentioned spanker or thruster is extremely large in size and very expensive, and therefore not suited to a single-propeller, single-rudder vessel (a fishing boat or small craft) for which economy is important.

In view of this, this invention provides a moving body control device, a moving body control method, and a moving body control program with which a moving body is made to pass a target position.

The moving body control device of this invention is a moving body control device in which a moving body is provided with a propulsion generator that propels a moving body in a particular direction and a movement direction adjuster that adjusts the direction of movement by the propulsion are provided to the moving body, and comprises disturbance direction estimation means for estimating the direction of disturbance that moves the moving body, moving body direction sensing means for sensing the direction in which the moving body is facing, position sensing means for sensing the position of the moving body, position setting means for setting a target position and a starting position, and control means for controlling the propulsion generator and the movement direction adjuster so that the direction in which the moving body is facing, as sensed by the moving body direction sensing means, is opposite to the direction of disturbance estimated by the disturbance direction estimation means, and for controlling the propulsion generator and the movement direction adjuster so that when the moving body has been drifted at least a specific distance from the target position set by the position setting means, it will return to the starting position, and the direction in which the moving body is facing at the starting position will be opposite to the direction of the disturbance.

The position setting means changes the starting position based on the distance between the target position and the position sensed by the position sensing means.

With the moving body control device of the present invention, the direction in which the moving body is facing is made opposite to the direction of disturbance (such as tide or wind) when the moving body is being drifted by the disturbance so as to pass a target position. Thus, the moving body can return to the starting position while passing the target position, without having to turn the rudder a large amount.

The position setting means changes the starting position based on the distance between the target position and the position of the moving body when the moving body is being drifted along. The distance includes the effect of deviation in the position of the moving body attributable to control to make the direction in which the moving body is facing be opposite to the direction of the disturbance.

The moving body control device of the present invention performs control to change the starting position so as to cancel out this deviation effect. Thus, when the moving body is drifted from a changed starting position, it will be able to pass the target position.

As discussed above, the moving body control device of the present invention allows for drift maneuvering in which a moving body, even a single-propeller, single-rudder vessel, can be repeatedly made to pass a target position.

The position setting means of the present invention may change the starting position based on the distance between the target position and the position of the moving body when the moving body drifted by the disturbance is closest to the target position.

Also, the position setting means of the present invention may change the starting position based on the average distance between the target position and the position of the moving body calculated for a specific length of time including the point when the moving body drifted by the disturbance is closest to the target position.

Furthermore, it is possible for the position setting means of the present invention to change the starting position based on the distance and a specific coefficient.

This specific coefficient is, for example, a value that is greater than zero and no more than 1. The control means uses a distance, obtained by multiplying the specific coefficient by the distance that is the deviation in the position of the moving body, as the amount of change in the starting position, without correcting the effect of deviation suddenly, and instead converging so that the effect is gradually eliminated.

Also, the disturbance may be wind that moves the moving body, and there may be a mode in which the control means makes the direction in which the moving body is facing be opposite to the direction of the wind.

The present invention is not limited to a device, and may also be a moving body control method for controlling a moving body, or a moving body control program that is executed by a moving body control device.

With this invention, the direction in which a moving body is facing is aimed in the disturbance direction, and the starting position from which the vessel is drifted is changed so as to pass a target position, so the moving body can be made to repeatedly pass the target position without having to attach a spanker or a thruster.

DETAILED DESCRIPTION OF EMBODIMENTS

A vessel comprising the moving body control device pertaining to an embodiment of the present invention will now be described through reference to the drawings.

The moving body control device pertaining to this embodiment is one that estimates the disturbance direction and repeatedly causes the vessel to pass a target position.

Figure 1:
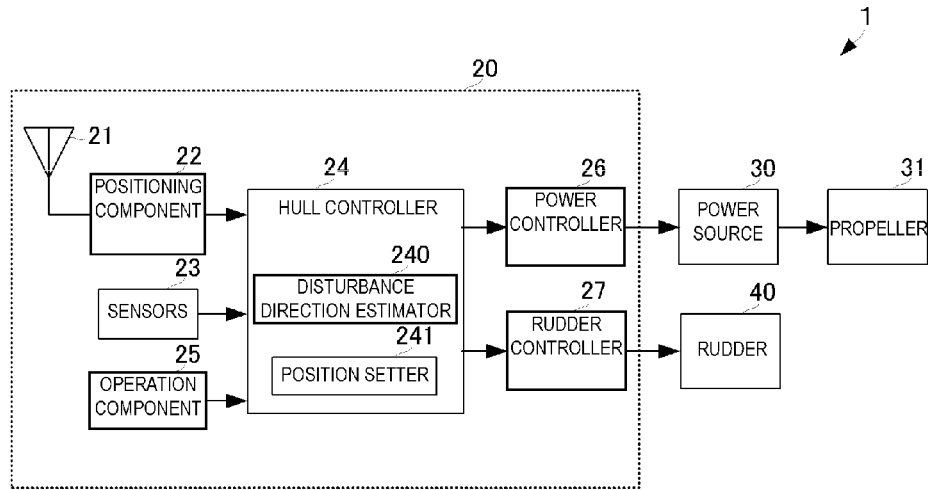
FIG. 1 is a block diagram of the main components of a vessel.

FIG. 1 is a block diagram of the main components of a vessel 1.

The vessel 1 comprises a hull control device 20, a power source 30, a propeller 31, and a rudder 40. The hull control device 20 comprises an antenna 21, a positioning component 22, sensors 23, a hull controller 24, an operation component 25, a power controller 26, and a rudder controller 27.

The hull controller 24 comprises a disturbance direction estimator 240 and a position setter 241.

The power source 30 and the propeller 31 correspond to the "propulsion generator" of the present invention. The rudder 40 corresponds to the "movement direction adjuster" of the present invention. The disturbance direction estimator 240 corresponds to the "disturbance direction estimation means" of the present invention. The positioning component 22 corresponds to the "position sensing means" of the present invention. The position setter 241 corresponds to the "position setting means" of the present invention. The hull controller 24 corresponds to the "control means" of the present invention.

The vessel 1 is a single-propeller, single-rudder vessel. That is, the direction of the position provided by the propeller 31 is the fore and aft direction of the vessel 1. Also, as shown in FIG. 1, the vessel 1 is equipped with just one rudder 40. Thus, the vessel 1 moves only in the fore and aft direction of the vessel 1.

The antenna 21 receives a GPS (global positioning system) positioning signal and outputs it to the positioning component 22. The positioning component 22 uses the GPS positioning signal to execute positioning computation, and calculates the position of the vessel 1. This positioning computation is executed at preset positioning timing intervals. The positioning component 22 outputs the calculated position of the vessel 1 to the hull controller 24.

The sensors 23 consist of whatever is necessary, such as a heading sensor, a wind direction sensor, a wind speed sensor, a tide gauge, or the like. The sensors 23 output the sensed heading, wind direction, wind speed, and tide current to the hull controller 24 at specific time intervals. The sensors 23 are included as necessary, and some of the above sensors are not always essential for the present invention. For instance, if the sensors 23 do not include a heading sensor, the hull controller 24 can estimate the heading from changes in the current position.

The operation component 25 is what is known as a user interface device, and outputs the operation inputs made by the user to the hull controller 24.

The position setter 241 stores a target position that the vessel 1 is supposed to pass. The position setter 241 also stores a starting position, which is where the vessel 1 starts to be drifted along, and a target heading, which is the heading when the vessel is drifted along. The target position is inputted by the user through the operation component 25.

The disturbance direction estimator 240 estimates the direction of the disturbance with respect to the vessel 1. Disturbances primarily consist of tide and wind.

The hull controller 24 sets control information for maintaining the heading of the vessel 1 or moving the vessel 1 to a specific position. This control information is composed of information about the amount of power and information about the propulsion direction, for example. Information about the amount of power is outputted to the power controller 26. Information about the propulsion direction is outputted to the rudder controller 27.

The power controller 26 controls the drive of the power source 30 based on information about the amount of power.

The power source 30 consists of a diesel engine or an electric motor. The power source 30 sends the power generated based on control by the power controller 26 to the propeller 31. The power source 30 may also be a hybrid mechanism comprising both a diesel engine and an electric motor.

The rudder controller 27 adjusts the angle of the rudder 40 with respect to the fore and aft direction based on information about the propulsion direction outputted from the hull controller 24.

The vessel 1 controls the propulsion of the propeller 31 and the angle of the rudder 40 to move toward the starting position or to pass the target position with the heading still aimed at the target heading.

Control to make the heading be opposite to the disturbance direction in this embodiment will now be described through reference to FIGS. 2, 3A and 3B.

First, estimating the disturbance direction will be described. FIG. 2 is a diagram showing an example of estimating the disturbance direction. In FIG. 2, a reference position Ppd is the position of a reference used in processing to estimate the disturbance direction. A current position Ps is the current position of the vessel 1.

To perform processing to estimate the disturbance direction, the user uses the operation component 25 to input position information about the reference position Ppd. The inputted position information is outputted to the position setter 241 for storage.

The reference position Ppd may be longitude and latitude, or may be set relatively to 10 m to the port side.

The disturbance direction estimator 240 then estimates the disturbance direction. The initial value of the disturbance direction may be any direction. For example, it may be due south. The hull controller 24 then outputs information about the propulsion direction so that the heading will be opposite to the estimated disturbance direction.

Figure 2:
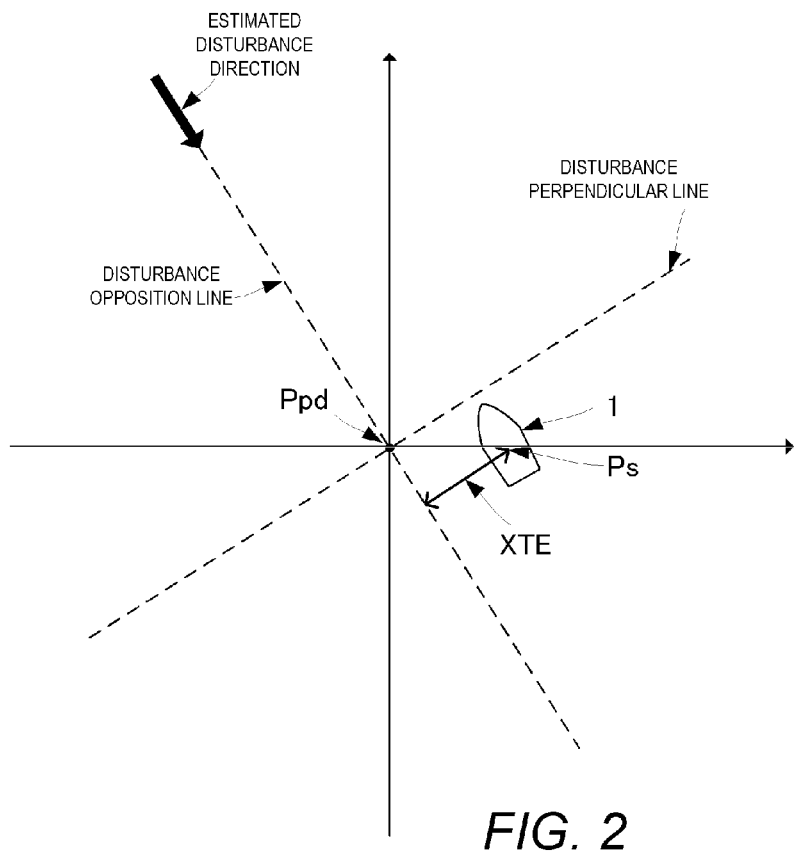
FIG. 2 is a diagram showing an example of estimating a disturbance direction.

As shown in FIG. 2, the disturbance direction estimator 240 then finds a disturbance opposition line that is parallel to the estimated disturbance direction and passes through the reference position Ppd, and the distance XTE (cross track error) from the current position Ps.

XTE is zero when the estimated disturbance direction and the heading coincide and the vessel 1 is headed for the reference position Ppd.

The disturbance direction estimator 240 then finds the XTE at specific time intervals, and calculates a new disturbance direction by calculating the difference between the estimated disturbance direction and a corrected value based on XTE, as expressed in the following Mathematical Formula 1.

$$\hat{\psi}_d = \psi_0 - \left\{ k_p \cdot XTE + \sum \left( k_{i1} \cdot XTE + k_{i2} \cdot \frac{d}{dt} XTE \right) \right\}$$ [Mathematical Formula 1]

$\hat{\psi}_d$: Estimated Disturbance Direction $\psi_0$: Initial Value of Estimated Disturbance Direction $k_p$: Proportional Correction Gain $k_{i1}$: First Integrated Correction Gain $k_{i2}$: Second Integrated Correction Gain Specifically, the disturbance direction estimator 240 updates the estimated disturbance direction so that XTE will be zero, based on the proportional component of XTE (the proportional correction gain term in Mathematical Formula 1) and the integrated component of XTE (the Σ term in Mathematical Formula 1).

The disturbance direction estimator 240 includes the differential term of XTE (the second integrated correction gain term in Mathematical Formula 1) in the integration component of XTE (the Σ term in Mathematical Formula 1), which speeds up convergence (until XTE becomes zero), and allows the estimated disturbance direction to be brought closer to the actual disturbance direction smoothly until convergence.

Nevertheless, estimating the disturbance direction with Mathematical Formula 1 is not essential, and the disturbance direction may be found by some other method.

The hull controller 24 then outputs control information about the propulsion direction so that the heading will be opposite to the updated estimated disturbance direction.

Next, the hull controller 24 switches between drift control and control of movement to the starting position, with direction control being performed all the while. Direction control is control to make the heading be opposite to the direction of the wind (out of the estimated disturbance direction). Drift control is control in which a disturbance causes the vessel to drift from the starting position, which is the position where the drifting started. Control toward the starting position is control to move the vessel 1 to the starting position.

First, direction control will be described through reference to FIG. 3A.

Figure 3A:
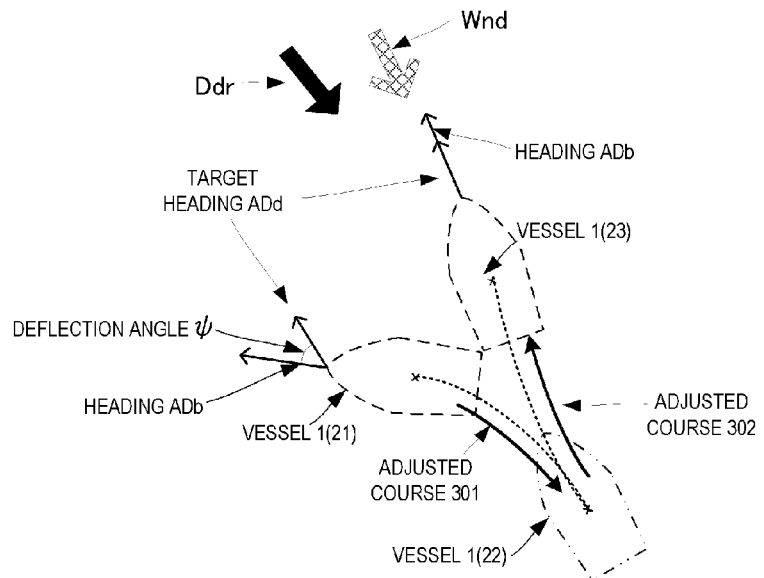
FIGS. 3A and 3B are diagrams showing an example in which the heading is made opposite to the disturbance as the moving body is drifted along.

In FIG. 3A, "vessel 1(n)" refers to the vessel 1 at a specific position (n). The heading ADb indicates the heading of the bow of the vessel 1. The disturbance vector Ddr is a vector indicating the direction and magnitude of the disturbance (such as wind or tide). The wind vector Wnd is a vector indicating wind direction and wind speed. The deflection angle ψ is the deflection angle between the heading ADb and the target heading ADd. The deflection angle ψ is a positive (+) angle if the heading ADb is a clockwise direction with respect to the target heading ADd, and is a negative (−) angle if the heading ADb is a counter-clockwise direction with respect to the target heading ADd.

The hull controller 24 sets the target heading ADd so that it will be opposite to the direction of the wind vector Wnd obtained by a wind direction sensor provided to the sensors 23. The hull controller 24 then outputs information about the propulsion direction so that the heading ADb will become the target heading ADd. The hull controller 24 may set the target heading ADd so as to be opposite to the estimated disturbance vector Ddr.

Figure 3B:
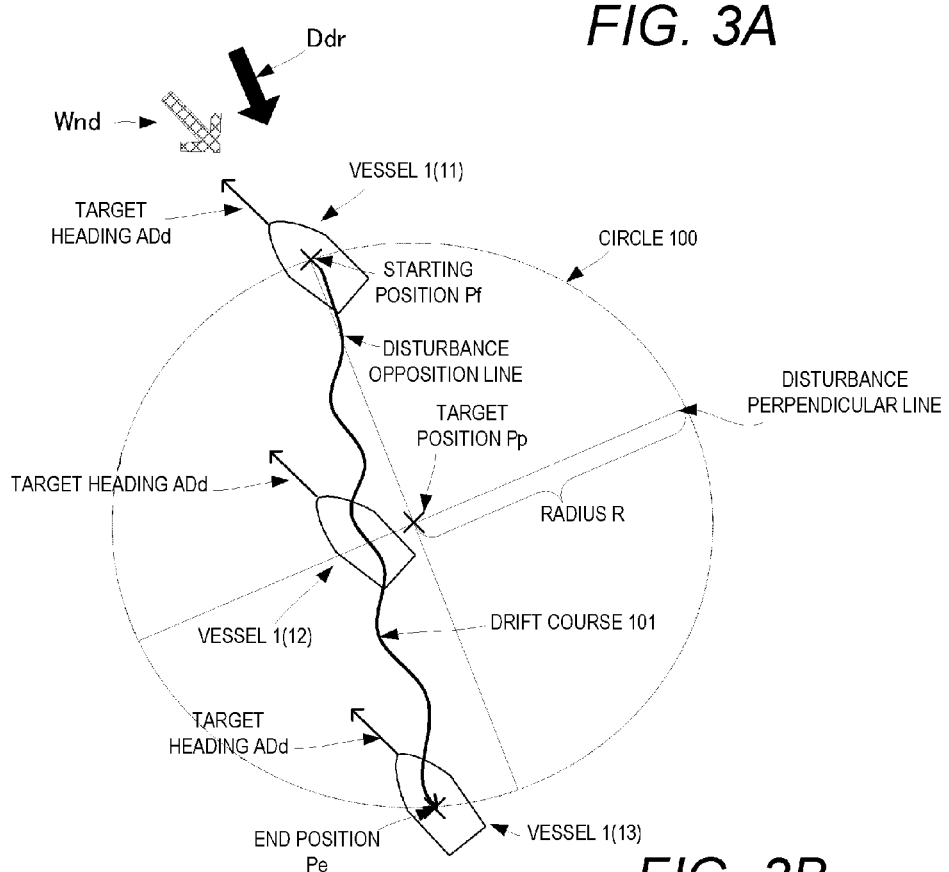

In FIGS. 3A and 3B, the vessel 1(21) is in a heading such that the heading ADb is counter-clockwise to the target heading ADd. Specifically, the deflection angle ψ between the target heading ADd and the heading ADb is a negative angle. The hull controller 24 outputs information about the propulsion direction in which the rudder 40 is turned left and information about the amount of power to move the vessel 1(21) backward when the absolute value of the negative deflection angle ψ is at or over a specific threshold, as seen in the vessel 1(21) in FIG. 3A. The vessel 1 then moves backward while the negative deflection angle ψ is brought closer to an angle of 0 degrees, as in the adjusted course 301. As a result, the deflection angle ψ is closer to an angle of 0 degrees than the deflection angle ψ in the state of the vessel 1(21). The hull controller 24 then outputs information about the propulsion direction in which the rudder 40 is turned right and information about the amount of power to move the vessel 1(22) forward.

The vessel 1(22) then moves forward while the negative deflection angle ψ is brought even closer to an angle of 0 degrees, as with the adjusted course 302. As a result, the deflection angle ψ becomes roughly zero. Specifically, the heading ADb coincides with the target heading ADd, as shown in the vessel 1(23).

When the deflection angle ψ is a positive angle and the absolute value of the deflection angle ψ is at or over a specific threshold, the hull controller 24 outputs information about the propulsion direction in which the rudder 40 is turned right and information about the amount of power to move the vessel 1 backward. Next, the hull controller 24 outputs information about the propulsion direction in which the rudder 40 is turned left and information about the amount of power to move the vessel 1 forward.

In the example shown in FIG. 3(A), the hull controller 24 performs control to move backward first, but control to move forward may instead be performed first.

Drift control will now be described.

The position setter 241 stores the target position Pp inputted by the user through the operation component 25. The position setter 241 also stores a starting position Pf. The starting position Pf is initially set as the current position Ps of the vessel 1.

The hull controller 24 then commences drift control when a start command is inputted by the user through the operation component 25. A start command is inputted by the user only once, and the drift control executed subsequently is started automatically by the hull controller 24.

The hull controller 24 performs direction control during drift control as well. As a result, the vessel 1 is drifted by the disturbance Ddr while the heading ADb is made to be opposite to the direction of the wind vector Wnd under direction control. The fisherman can perform trolling because the vessel 1 is drifted along while the heading ADb is made opposite to the wind direction.

Also, the direction at the target position Pp that the vessel 1 is supposed to pass from the end position Pe, which is the position where the drifting ends, can be prevented from deviating to the heading ADb (such as ending up being perpendicular). As a result, when the vessel 1 returns to the starting position Pf, there will be no need to turn the rudder 40 very much in order to pass the target position Pp, and there will be no need to travel over an unnecessary course. Furthermore, since the rudder 40 of the vessel 1 does not need to be turned very much, the heading ADb at the starting position Pf can be the target heading ADd.

The position setter 241 finds the drift course 101 shown in FIG. 3B. That is, the position setter 241 finds the drift course 101 from the history of the current position Ps found at specific time intervals while the vessel 1 is drifting from the starting position Pf to the end position Pe.

Control of movement to the starting position will now be described through reference to FIG. 3B.

The hull controller 24 switches the drift control to control of movement to the starting position, while performing direction control, once the vessel 1 drifts from the target position Pp to the end position Pe, which is a distance R away on the downstream side of the disturbance.

The position setter 241 changes the starting position Pf[n] to a new starting position Pf[n+1] when it switches to control of movement to the starting position.

An example in which the position setter 241 changes the starting position Pf[n] will be described through reference to FIGS. 4A and 4B.

Figure 4A:
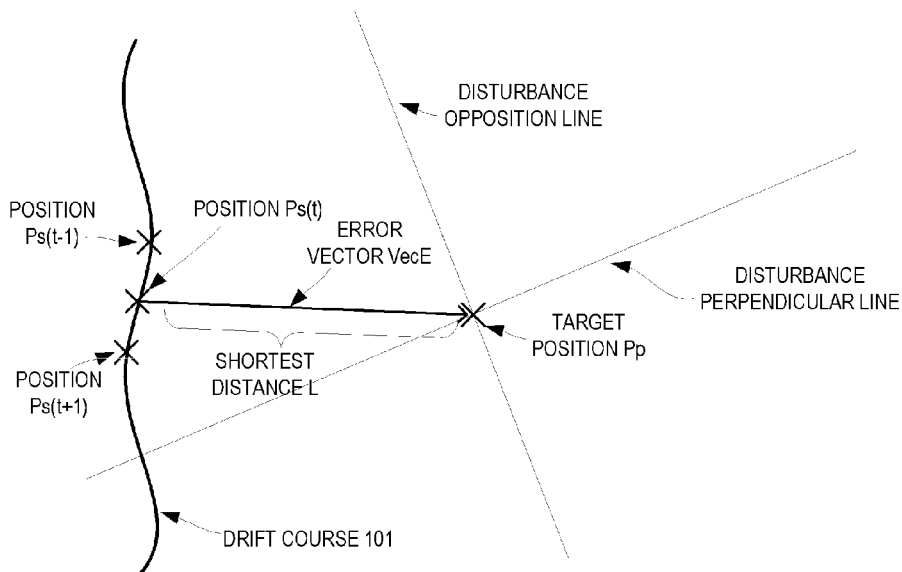
FIGS. 4A and 4B are diagrams showing an example of changing the starting position.

FIG. 4A shows the distance from the target position Pp to the drift course 101. The position Ps(t) is the position of the vessel 1 at a time t.

The position Ps(t) is the nearest position, which is the position where the vessel is closest to the target position Pp on the drift course 101. The shortest distance from the position Ps(t) to the target position Pp is the distance L, as shown in FIG. 4A.

The position setter 241 uses the position Ps(t) as a reference, and changes the starting position Pf[n] based on an error vector VecE, which is a vector facing the target position Pp.

The error vector VecE includes the effect of deviation in the position Ps of the vessel 1 that occurs because the vessel 1 moves forward or backward in order to keep the heading ADb at the target heading ADd.

Here, the direction and magnitude of disturbance on the sea can be considered to be constant, regardless of position, within a specific range centered on the starting position Pf[n].

In view of this, the position setter 241 changes the starting position Pf based on deviation in the position Ps attributable to control for maintaining the heading ADb, so as to cancel out this deviation.

Figure 4B:
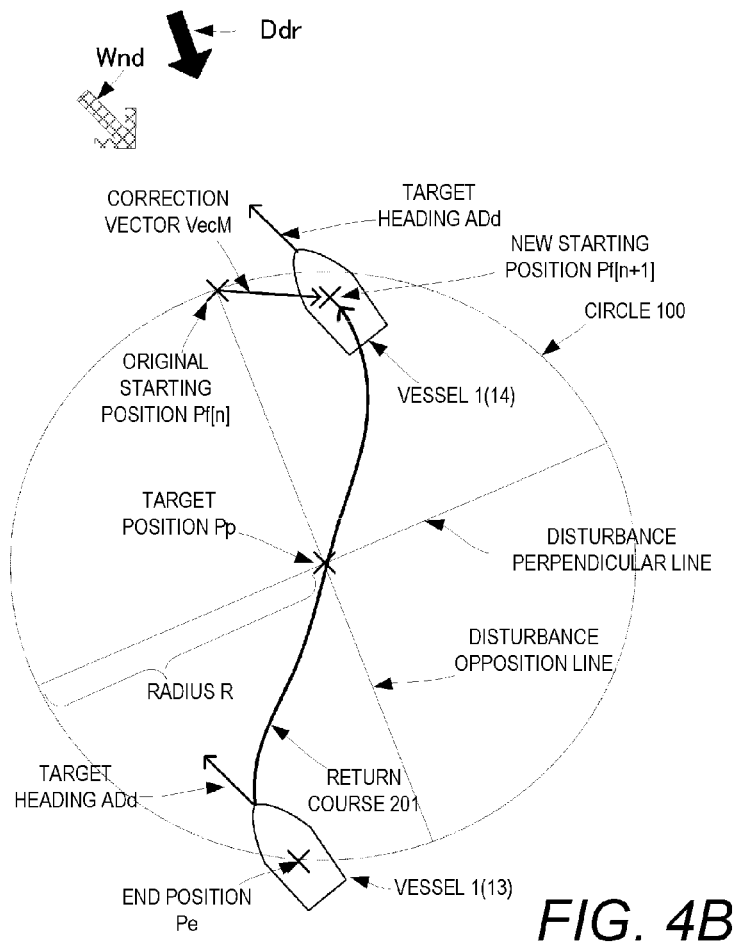

As shown in FIG. 4B, the position setter 241 sets a position moved by a correction vector VecM from the starting position Pf[n] as the new starting position Pf[n+1].

The correction vector VecM is parallel to the error vector VecE, and is α times larger (where α is a specific coefficient). The specific coefficient α is greater than zero and no more than 1. That is, the starting position Pf[n+1] is calculated as follows.

$$Pf[n+1]=Pf[n]+\alpha \cdot VecE$$

As shown in FIG. 4B, when the new Pf[n+1] is set, the hull controller 24 outputs control information so as to pass the target position Pp.

More specifically, the hull controller 24 outputs control information so that the vessel 1 will move at a combined propulsion vector obtained by the weighted addition of a propulsion vector 1 facing the target position Pp from the end position Pe and using the end position Pe as a reference, and a propulsion vector 2 facing the new starting position Pf[n+1] from the target position Pp and using the target position Pp as a reference. In this case, the hull controller 24 changes the addition ratio based on the distance from the current position Ps to the target position Pp. For example, the hull controller 24 performs the addition so that the addition ratio of the propulsion vector 2 will be higher the shorter is the distance from the current position Ps to the target position Pp. Also, the hull controller 24 performs the addition so that the addition ratio of the propulsion vector 1 will be higher the longer is the distance from the current position Ps to the target position Pp.

When the target position Pp is passed, the hull controller 24 outputs control information so that the vessel 1 will move at a combined propulsion vector obtained by the weighted addition of a the propulsion vector 2 and a propulsion vector 3. The propulsion vector 3 is set so as to be opposite to the wind vector Wnd at the starting position Pf[n+1], using the new starting position Pf[n+1] as a reference. Here again, the hull controller 24 performs addition so that the addition ratio of the propulsion vector 3 is higher the shorter is the distance from the current position Ps to the starting position Pf[n+1]. The hull controller 24 performs addition so that the addition ratio of the propulsion vector 2 is higher the longer is the distance from the current position Ps to the starting position Pf[n+1]. The speed of the wind vector Wnd is found with an anemometer provided to the sensors 23.

As shown by the return course 201 in FIG. 4(B), when the vessel 1 passes the target position Pp and reaches the starting position Pf[n+1], the hull controller 24 returns automatically to drift control, while maintaining direction control.

Figure 5:
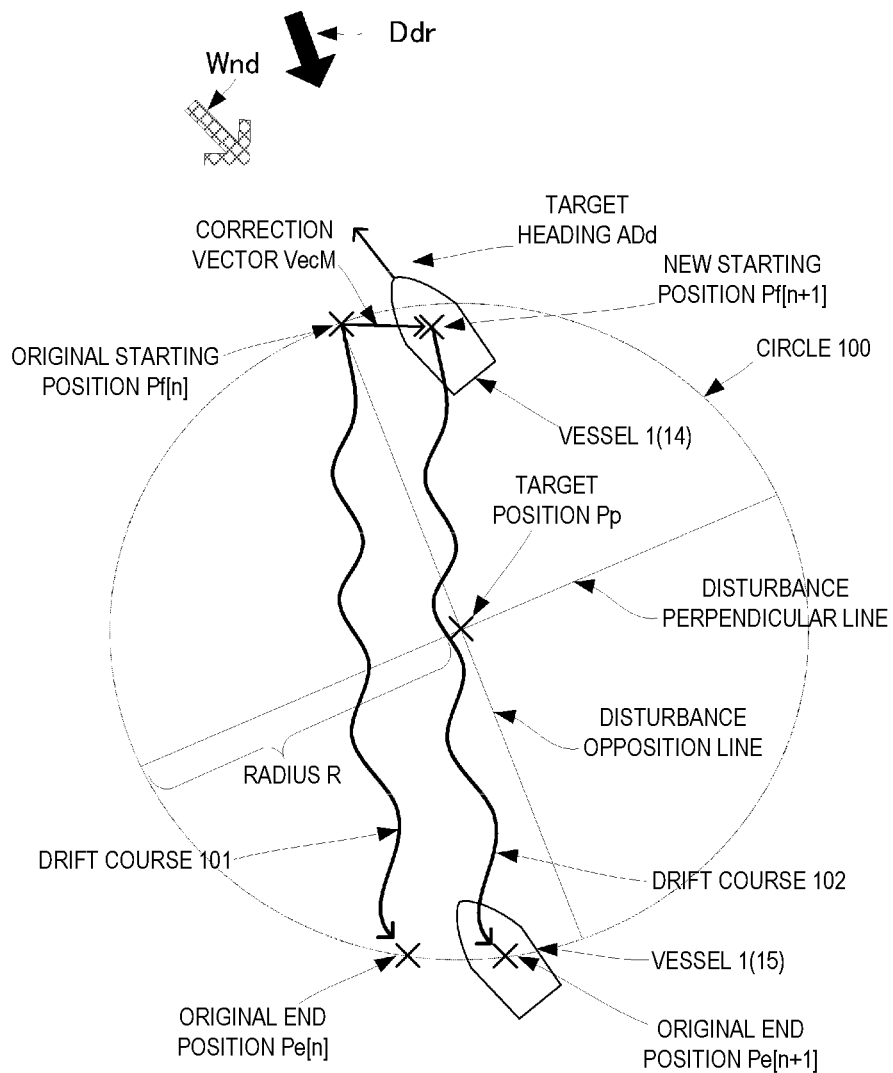
FIG. 5 is a diagram showing an example in which the moving body is drifted from a new starting position.

FIG. 5 is a diagram showing an example in which the vessel 1 is drifted from the starting position Pf[n+1] under drift control. As shown in FIG. 5, the vessel 1(14) is drifted along the drift course 102 to the end position Pe[n+1] when drift control is performed from the starting position Pf[n+1]. The deviation between the target position Pp and the position Ps of the vessel 1 is less than the deviation when the vessel 1 is drifted from the starting position Pf[n] because the starting position Pf[n+1] is corrected so as to cancel out the error vector VecE.

As discussed above, the hull controller 24 repeats processing to change the starting position Pf when the vessel is drifted away along the disturbance by a specific distance from the target position Pp. As a result, the vessel 1 is drifted along a course that gradually moves closer to the target position Pp.

Also, the starting position Pf[n+1] is changed so as to cancel out the deviation in the position of the vessel 1 based on the shortest distance from the target position Pp to the drift course 101. As a result, the amount of change in the starting position Pf (the distance) is kept to a minimum, so the navigation distance is shorter and the vessel 1 can repeatedly pass the target position more efficiently.

Furthermore, the amount of change in the starting position Pf[n+1] is calculated based on a specific coefficient α and the distance from the target position Pp to the drift course 101. As a result, the path of the vessel 1 converges so that the deviation is gradually eliminated, without being corrected suddenly.

In the above embodiment, the position setter 241 changed the starting position Pf based on the shortest distance from the drift course 101 to the target position Pp, but using the shortest distance is not the only option, and it is also possible to change the starting position Pf as follows, for example.

The position setter 241 can find the error vector VecE using the distance from the positions of the vessel 1 calculated at points before and after the point when the shortest distance was sensed to the target position Pp, in addition to the shortest distance.

For instance, the position setter 241 can use the average of the distances from the position Ps(t−1), the position Ps(t), and the position Ps(t+1) shown in FIG. 4A to the target position Pp. The time t is the clock time after a specific length of time (such as 3 seconds) has elapsed since the time t−1. The time t+1 is the clock time after a specific length of time (such as 3 seconds) has elapsed since the time t.

Figure 6A:
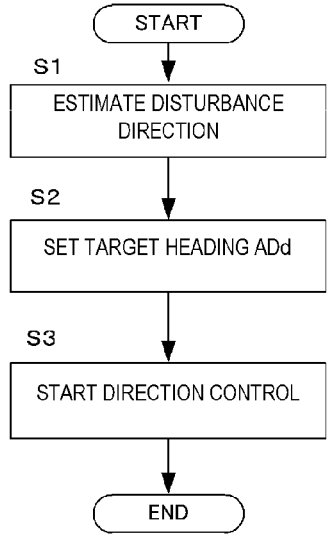
FIGS. 6A, 6B and 6C are flowcharts of the processing of the vessel pertaining to an embodiment of the present invention.
Figure 6B:
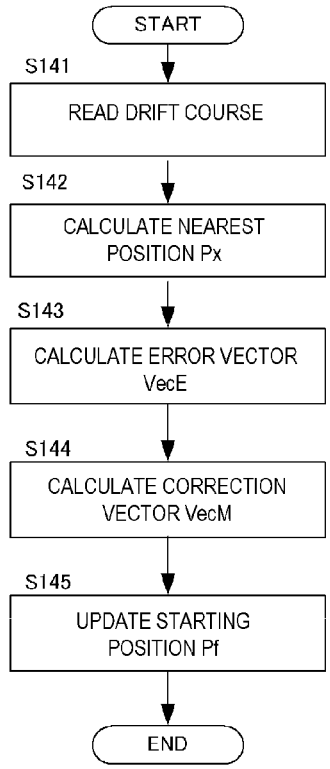
Figure 6C:
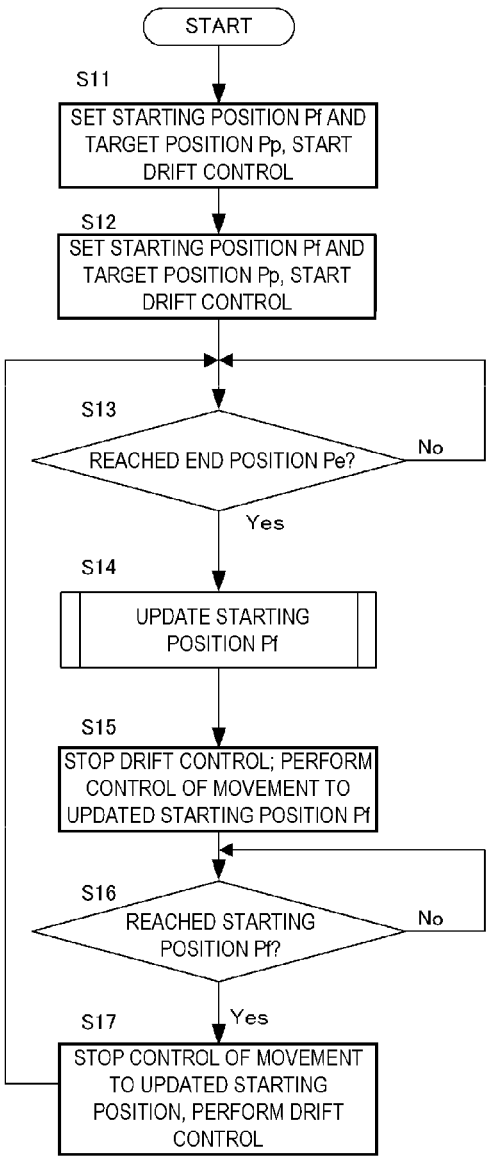
Figure 7A:
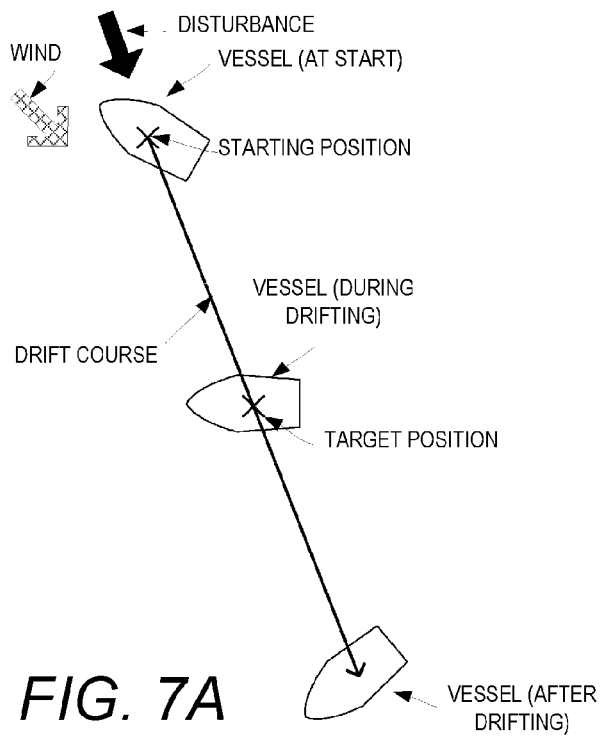
FIGS. 7A and 7B are diagrams illustrating the movement of a conventional vessel.
Figure 7B:
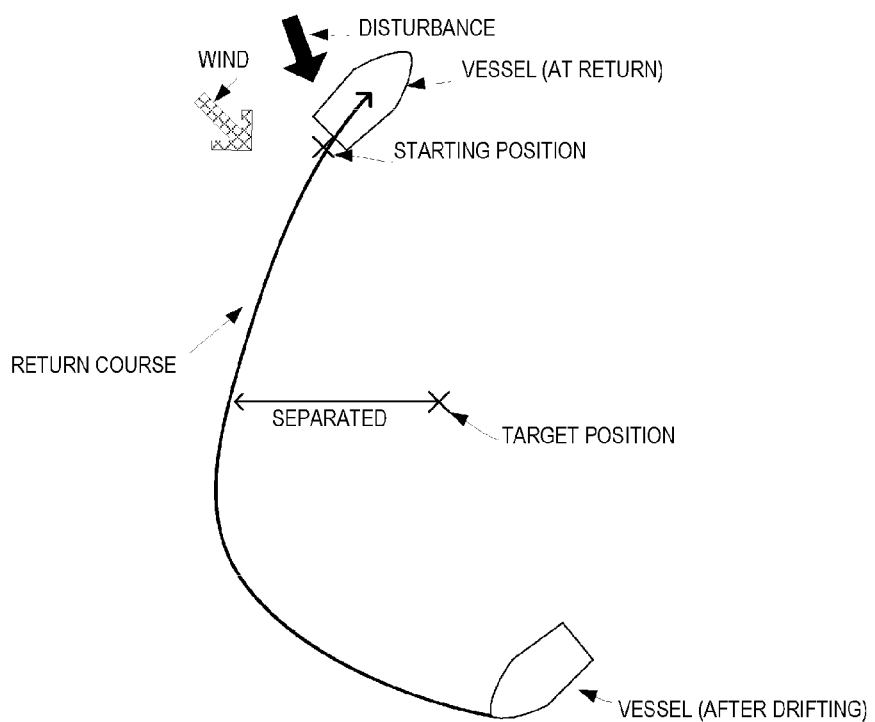

FIGS. 6A, 6B and 6C are flowcharts of the processing of the hull control device 20. FIG. 6A is a flowchart of direction control. FIG. 6B is a flowchart of switching between drift control and control of movement to the starting position. FIG. 6C is a flowchart of processing to update (change) the starting position.

As shown in FIG. 6A, the disturbance direction estimator 240 estimates the disturbance direction (S1). The position setter 241 then sets the target heading ADd so as to be opposite to the disturbance direction estimated in step S1 (S2). The hull controller 24 then commences direction control so that the heading ADb will become the target heading ADd (S3).

The vessel 1 always performs steps S1 to S3 to make the heading ADb opposite to the disturbance direction, regardless of drift control or control of movement to the starting position.

As shown in FIG. 6B, upon receipt of a drift control start command, the position setter 241 stores the starting position Pf as the current position Ps. The position setter 241 also stores the target position Pp (S11). However, the target position Pp is inputted by the user through the operation component 25. The hull controller 24 commences drift control once the starting position Pf and the target position Pp have been stored (S12).

The hull controller 24 determines whether or not the vessel 1 has reached the end position Pe, which is the distance R away from the target position Pp, based on the distance between the target position Pp and the current position Ps (S13). When the vessel 1 reaches the end position Pe (Yes in S13), the hull controller 24 proceeds to step S14. If the vessel 1 has not reached the end position Pe (No in step S13), the hull controller 24 continues drift control.

Upon proceeding to step S14, the hull controller 24 updates the starting position Pf. The flow of processing to update the starting position Pf will be described through reference to FIG. 6C.

The position setter 241 reads the drift course (S141). The position setter 241 then finds the nearest position Px (the position that is closest to the target position Pp) on the drift course (S142).

The position setter 241 then finds the error vector VecE based on the nearest position Px and the target position Pp (S143). The position setter 241 then uses the error vector VecE and the specific coefficient α to find the correction vector VecM (S144).

The last thing in the update processing of the starting position is for the position setter 241 to update the starting position Pf based on the correction vector VecM (S145).

Returning to FIG. 6B, when the starting position Pf is updated (S14), the hull controller 24 stops drift control and performs control of movement to the updated starting position Pf (S15).

The hull controller 24 determines whether or not the starting position Pf has been reached (S16). If the vessel 1 has reached the starting position Pf (Yes in S16), the hull controller 24 proceeds to step S17. If the vessel 1 has not reached the starting position Pf (No in S16), the hull controller 24 continues control of movement to the starting position Pf.

Upon proceeding to step S17, the hull controller 24 stops control of movement to the starting position Pf. The hull controller 24 then returns to drift control (S17).

Drift control is performed until the vessel 1 reaches the end position Pe (No in S13).

As discussed above, the hull control device 20 alternately executes drift control and control of movement to the starting position, while performing direction control.

In the above description, an example was given in which the various functional components were hardware, but the positioning component 22, the hull controller 24, the power controller 26, and the rudder controller 27 can also be realized as software. That is, the processing of these functional components can be programmed and stored on a storage medium, and the hull control programs can then be read out and executed by a computer or the like so that the processing discussed above can be carried out.

Also, in the above description, a vessel was used as an example of a moving body, but the components and processing discussed above can also be applied to a moving body that moves on or through water and comprises propulsion power in only a particular direction (such as an amphibious vehicle or person water craft).

The invention claimed is:

1. A moving body control device for controlling a moving body that comprises a propulsion generator that propels the moving body in a particular direction and a movement direction adjuster that adjusts a movement direction by propulsion of the propulsion generator, the moving body control device comprising:
   a moving body direction sensor configured to sense a heading direction of the moving body;
   a position sensor configured to sense a position of the moving body; and
   processing circuitry configured:
      to estimate a direction of disturbance that moves the moving body;
      set a target position and a starting position;
      to control the propulsion generator and the movement direction adjuster such that the heading direction sensed by the moving body direction sensor is opposite to the direction of the disturbance estimated by the processing circuitry, and when the moving body has been drifted at least a specific distance from the target position set by the processing circuitry, the moving body returns to the starting position, and the heading direction at the starting position is opposite to the direction of the disturbance; and to change the starting position based on a distance between the target position and the position of the moving body sensed by the position sensor.

2. The moving body control device according to claim 1, wherein
the processing circuitry is further configured to change the starting position based on the distance between the target position and the position of the moving body when the moving body drifted by the disturbance is closest to the target position.

3. The moving body control device according to claim 1, wherein
the processing circuitry is further configured to change the starting position based on an average distance between the target position and the position of the moving body calculated for a specific length of time including a timing when the moving body drifted by the disturbance is closest to the target position.

4. The moving body control device according to claim 1, wherein
the processing circuitry is further configured to change the starting position based on the distance and a specific coefficient.

5. The moving body control device according to claim 1, wherein
the disturbance is wind that moves the moving body, and
the processing circuitry is further configured to control the propulsion generator and the movement direction adjuster such that the heading direction sensed by the moving body direction sensor is opposite to a direction of the wind.

6. A moving body control method for controlling a moving body that comprises a propulsion generator that propels the moving body in a particular direction and a movement direction adjuster that adjusts a movement direction by propulsion of the propulsion generator, the method comprising:
estimating a direction of disturbance that moves the moving body;
sensing a heading direction of the moving body;
sensing a position of the moving body;
controlling the propulsion generator and the movement direction adjuster such that the heading direction is opposite to the direction of the disturbance and
setting a target position and a starting position,
the setting of the target position and the starting position including changing the starting position based on a distance between the target position and the position of the moving body, and
the controlling of the propulsion generator and the movement direction adjuster including controlling the propulsion generator and the movement direction adjuster such that when the moving body has been drifted at least a specific distance from the target position, the moving body returns to the starting position, and the heading direction at the starting position is opposite to the direction of the disturbance.

7. A non-transitory computer readable medium storing a moving body control program that is executed by a moving body control device, for controlling a moving body that comprises a propulsion generator that propels the moving body in a particular direction and a movement direction adjuster that adjusts a movement direction by propulsion of the propulsion generator, the program causing the moving body control device to execute:
estimating a direction of disturbance that moves the moving body;
sensing a heading direction of the moving body;
sensing a position of the moving body;
controlling the propulsion generator and the movement direction adjuster such that the heading direction is opposite to the direction of the disturbance; and
setting a target position and a starting position,
the setting of the target position and the starting position including changing the starting position based on a distance between the target position and the position of the moving body, and
the controlling of the propulsion generator and the movement direction adjuster including controlling the propulsion generator and the movement direction adjuster such that when the moving body has been drifted at least a specific distance from the target position, the moving body returns to the starting position, and the heading direction at the starting position is opposite to the direction of the disturbance.

8. The moving body control device according to claim 2, wherein
the processing circuitry is further configured to change the starting position based on the distance and a specific coefficient.

9. The moving body control device according to claim 3, wherein
the processing circuitry is further configured to change the starting position based on the distance and a specific coefficient.

10. The moving body control device according to claim 2, wherein
the disturbance is wind that moves the moving body, and
the processing circuitry is further configured to control the propulsion generator and the movement direction adjuster such that the heading direction sensed by the moving body direction sensor is opposite to a direction of the wind.

11. The moving body control device according to claim 3, wherein
the disturbance is wind that moves the moving body, and
the processing circuitry is further configured to control the propulsion generator and the movement direction adjuster such that the heading direction sensed by the moving body direction sensor is opposite to a direction of the wind.

12. The moving body control device according to claim 4, wherein
the disturbance is wind that moves the moving body, and
the processing circuitry is further configured to control the propulsion generator and the movement direction adjuster such that the heading direction sensed by the moving body direction sensor is opposite to a direction of the wind.

13. The moving body control device according to claim 8, wherein
the disturbance is wind that moves the moving body, and
the processing circuitry is further configured to control the propulsion generator and the movement direction adjuster such that the heading direction sensed by the moving body direction sensor is opposite to a direction of the wind.

14. The moving body control device according to claim 9, wherein the disturbance is wind that moves the moving body, and the processing circuitry is further configured to control the propulsion generator and the movement direction adjuster such that the heading direction sensed by the moving body direction sensor is opposite to a direction of the wind.

\* \* \* \* \*